United States Patent [19]

Checkwood et al.

[11] 4,242,969
[45] Jan. 6, 1981

[54] TABLE AND SHELF ASSEMBLY

[75] Inventors: Andrew R. Checkwood, 18379 Lake Encino Dr., Encino, Calif. 91316; Andrew M. Checkwood, 9438 Trebert Pl., Tujunga, Calif. 91042

[73] Assignees: Andrew R. Checkwood; Andrew M. Checkwood; Larry Checkwood, all of Sun Valley, Calif.

[21] Appl. No.: 13,212

[22] Filed: Feb. 21, 1979

[51] Int. Cl.³ .................... A47B 3/06; F16D 1/00
[52] U.S. Cl. .................... 108/153; 108/111; 108/156; 403/170; 403/178; 403/295
[58] Field of Search .......... 108/153, 156, 159, 91, 108/111; 403/170, 172, 171, 295, 174, 178, 169, 176

[56] References Cited

U.S. PATENT DOCUMENTS

| 3,065,860 | 11/1962 | Swanson | 108/156 X |
| 3,344,756 | 10/1967 | Kelson | 108/156 X |
| 3,711,133 | 1/1973 | Werner | 403/172 |
| 3,797,194 | 3/1974 | Ekstein | 403/295 |
| 3,851,980 | 12/1974 | Worth et al. | 108/159 X |
| 3,886,710 | 6/1975 | Krause et al. | 403/170 X |
| 3,958,517 | 5/1976 | Jay | 108/159 |
| 4,111,577 | 9/1978 | Kiyosawa | 403/172 |

FOREIGN PATENT DOCUMENTS

| 870861 | 5/1971 | Canada | 403/295 |
| 1349424 | 12/1963 | France | 403/170 |
| 1011688 | 12/1965 | United Kingdom | 403/178 |

Primary Examiner—James T. McCall
Attorney, Agent, or Firm—John E. Wagner

[57] ABSTRACT

A basically metal frame coffee table or stacked shelves or the like employing a plurality of tubes of circular, square or other regular shape joining at intersections by an improved corner member. The improved corner member is preferably die cast in a single piece including a pair of arms which define connectors for two adjoining tubes and an orthogonal opening to receive a leg. The corner member includes an integral support for holding a shelf. The integral support conceals a fastening member employed to hold the leg in place. Each of the arms define at least one recess at a predetermined distance outward from the corner and located in intimate contact relationship with the frame tubing whereby the tubes may be assembled to the corners merely by staking the underside of the frame to deform the tube locally into the recess of the corner member and thereby produce a fixed permanent frame. The legs are secured to the frame by removable fasteners whereby the legs may be removed, stored flat and the entire table may be transported in a flat or "knocked down" condition and easily assembled with one simple tool. In one embodiment the leg tube opening in the corner member is capped to provide an ornamental top. In another embodiment the leg tube opening extends fully through the corner member to provide for continuous upright leg members and for use in stacked tables or shelves.

6 Claims, 10 Drawing Figures

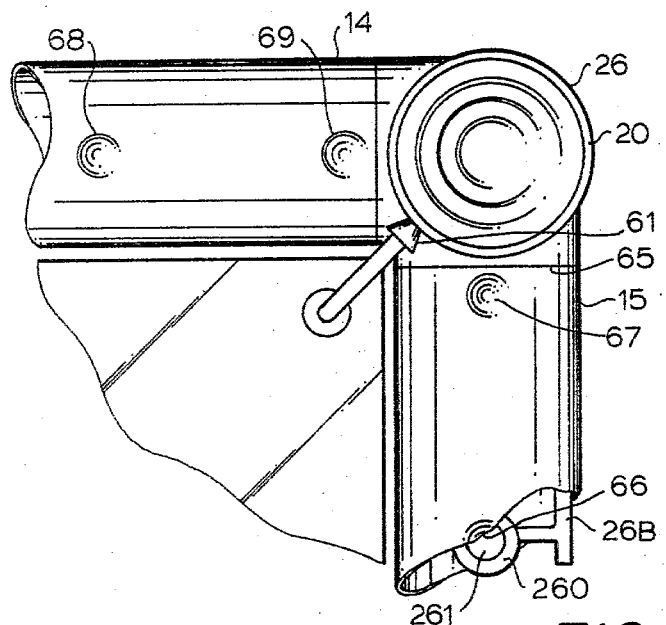
FIG. 4
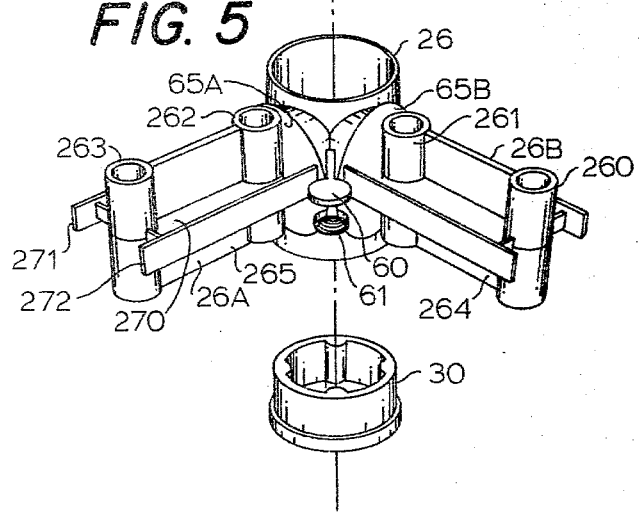
FIG. 5
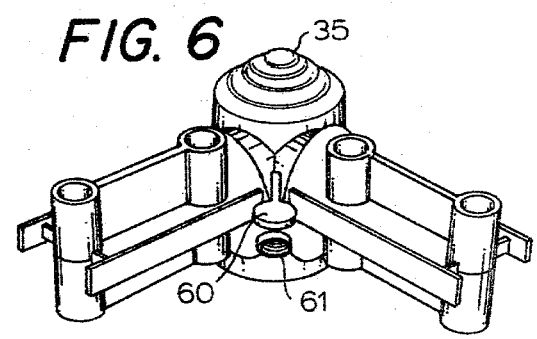
FIG. 6
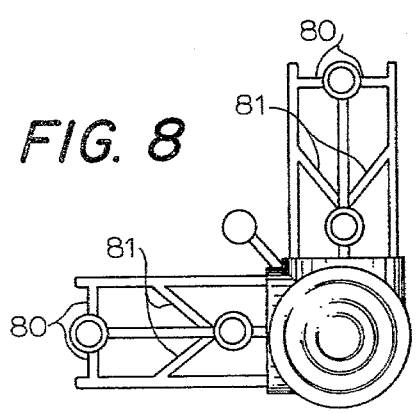
FIG. 8
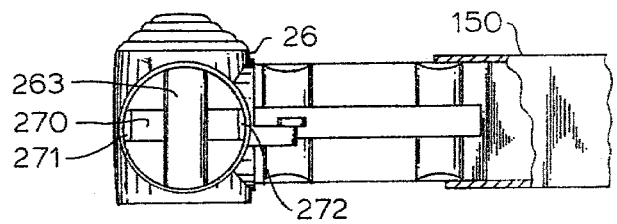
FIG. 7
FIG. 9

TABLE AND SHELF ASSEMBLY

BACKGROUND OF THE INVENTION

Great interest has developed in metal frame furniture which has progressed from the basic simple metal frame table of the past to highly attractive table configurations which one is proud to have grace their living room. The attractiveness of such tables often has been the result of the attractive combination of highly polished metals framework and sparkling glass. Tables of this type have been produced in which the four legs and a rectangular frame have been welded into a single assembly and a glass top has been located on top of the frame with suitable restrainers, recessed within a stepped frame. In certain cases, the top is supported below the upper surface of the frame. This type of table has epitomized the metal frame table in its most popular form.

Recently, an attractive variation on the foregoing metal frame table has appeared in which the frame and leg members are all tubes which are interconnected by corner members which may be of stamped or die cast metal. In certain cases, the corner member has been given an ornamental coating such as brass plating differing from the finish on the metal tube providing an attractive contrast. This type of corner assembly has produced a near duplicate in function if not exact appearance of the welded frame table.

Both types of tables described above suffer from one serious limitation in that as a permanent structure they define a three dimensional shape determined by the length and width of the top and the height of the legs. Commonly, each table must be separately boxed and separately transported. The volume of the furniture becomes a burden and special provisions must be made to avoid the legs punching through a box if not properly handled or stored. Such a pair of problems as excess volume and danger of damage are truly of serious concern in the furniture industry.

BRIEF DESCRIPTION OF THE INVENTION

Faced with the foregoing state of the art, we have developed an improved ornamental table in which a single basic corner member provides for
(a) permanent assembly of the table framework without fasteners;
(b) secure mounting of the legs when assembled;
(c) transportation of the table with the legs removed;
(d) simple assembly with a single tool in just a matter of a minute or two;
(e) concealment of the assembly details when the table is in normal use;
(f) integral support of the top;
(g) either single table or stackable tables or shelves produced employing basically the single corner member design.

Basically, our invention involves the use of tubular framework and leg members having any preferred but uniform cross-section such as a circular tube. The framework members and the legs are assembled at the corner junctions which are defined by a single formed corner member having at least two arms which join with adjacent tubes and which defines a leg opening at the junction of the two arms. The corner member arms each include a recess at a predetermined distance from its root and in the edge adjacent to the encircling framework tube. The tubes and corner members are assembled by staking the tube into the recess.

At the junction of the two arms in the corner member, an integral shelf holder is formed which acts as a corner support for whatever top is used. Beneath this shelf on the corner support is a fastener which engages any tube extending into the leg opening in the corner. In one embodiment, the opening is closed at its upper defining an ornamental top for the corner. In another embodiment, an opening extends through the corner member and allows the tube to extend therethrough and to provide for stacking shelves.

BRIEF DESCRIPTION OF THE DRAWING

This invention may be more clearly understood from the following detailed description and be reference to the drawing in which:

FIG. 4 is a fragmentary bottom view of a corner;

FIG. 5 is a perspective view of a corner member of this invention and leg foot;

FIG. 6 is a perspective view of an alternate corner embodiment;

FIG. 7 is a side elevational view of the embodiment of FIG. 6;

FIG. 8 is a bottom view thereof; and

FIG. 9 is an end view thereof.

DETAILED DESCRIPTION OF THE INVENTION

Figure 1:
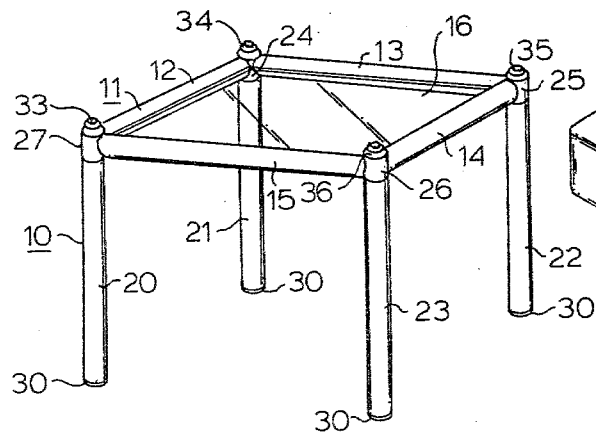
FIG. 1 is a perspective view of a table incorporating this invention.

Referring now to the drawing, FIG. 1 shows an occasional table generally designated 10, comprising a framework 11 made up of four siderails 12, 13, 14 and 15, supporting a top 16, which in this case is transparent glass, acrylic or other material. Four legs 20 through 23 complete the table. The framework 11 is joined together and the legs secured to the framework by a plurality of corner members 24 through 27. Each of the legs preferably have a resilient foot designated generally 30. The size and shape of the table depends upon the decor and use. As shown, the table is rectangular in shape of the size which might be used as an end table in the living room. In accordance with this invention, there are no restrictions on the size nor do the corners need to be right angles. For example, an octagonal table can be produced employing this invention provided the corner members 22 through 26 incorporate the appropriate angle greater than 90 degrees between the intersections of the frame members.

Figure 1A:
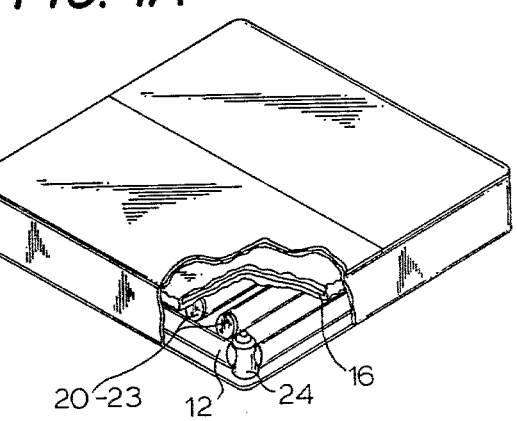
FIG. 1a is a perspective view of this table of FIG. 1 packed for shipment.

As shown in FIG. 1, the table is of single level and each corner members 24 through 27 has an upper cap 33 through 36 which may be an integral part of corner 23 through 26 or may be formed as a separate, removable member. As will be described further in connection with this invention, the framework 11, including corners 24 through 27, are permanently assembled and each of the legs 20 through 23 are separable from the table for transportation. The net result is that the table FIG. 1 may be packed and shipped knocked down in a container similar to that shown in FIG. 1A with the greatest height of the container being determined by the height of the corner members 24 through 27 and the product shipped with the glass suitably protected. The legs 20 through 23, are similarly suitably protected and stored within the framework. Thus, for a table as shown in FIG. 1, typically having a height of 18 inches when assembled, a length of 24 inches and a depth of 20 inches, the shipping container therefore may have an inside dimension of approximately 20 by 24 by 3 inches, the height of the corner member. The saving, in not only volume but reduction of risk of damage in transit, is of great importance to the utility of this invention. The means by which this is accomplished is described below.

Figure 2:
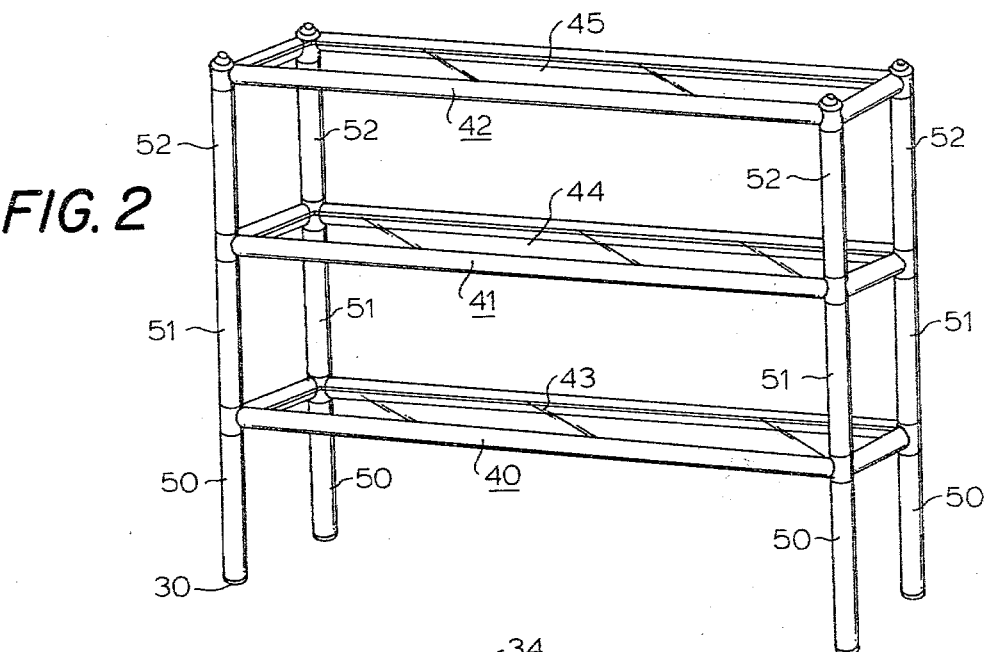
FIG. 2 is a perspective view of an assembly of shelves employing this invention.

FIG. 2 illustrates the same basic principal employed in the table of FIG. 1, however, a free-standing bookshelf is illustrated therein, employing three frameworks 40, 41 and 42, each supporting a respective top 43, 44 and 45, again shown to be transparent. A plurality of leg sections which may be the height of a single shelf may be used. In such case, there are four identical leg sections 50, as well as four identical leg sections 51 and four identical leg sections 52. In such a case, the bookshelf may be demountable and changeable as to the number of shelves and also the lengths of legs 51 and 52 do not have to be identical with each other, thus allowing different size shelves. Alternately, in accordance with this invention, each leg assembly now designated as 50, 51 and 52, may be a single unitary member and each of the features of this invention may still be obtained. In such case, the shelf assembly is of fixed height although the intermediate shelves may be changed in vertical position as will be described herein below.

Figure 3:
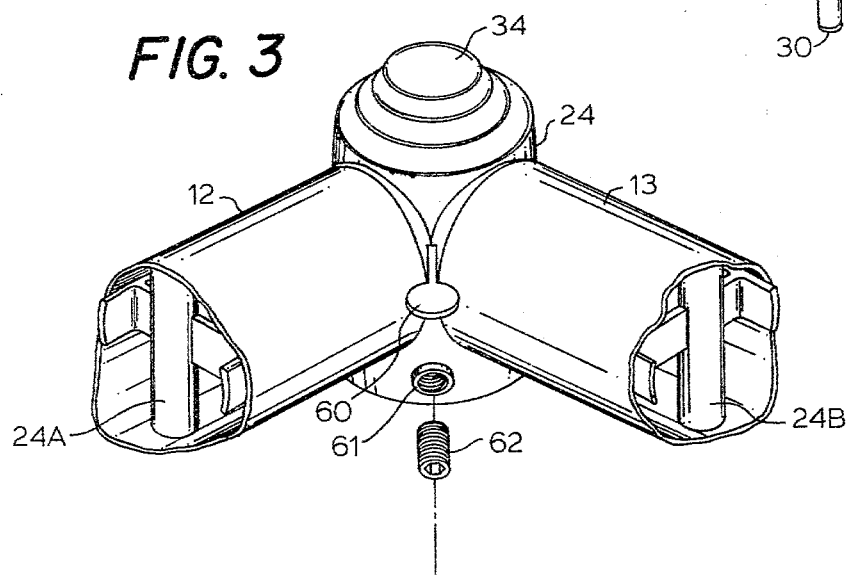
FIG. 3 is an enlarged perspective fragmentary corner view.

Each of the features described are accomplished employing the basic corner member which is shown in perspective form in FIG. 3. In FIG. 3, the corner 24 of FIG. 1 appears with its adjoining frame members 12 and 13 which intersect in this case at a 90 degree angle. The frame members 12 and 13 are shown to be circular tubes. A pair of arms 24A and 24B of the corner members 24 extend out of the broken away portions of the tubes 12 and 13 respectively. Thus it may be seen that the corner member 24 is in telescoping internal engagement with the tubes 12 and 13. As illustrated herein, the tubes are circular and the arms 24a and 24b configured to be inserted into a circular tube. There is no such restriction on shape and the tubes may be square, rectangular or other regular shape to allow the telescoping relationship with the arms of the corner member 24.

In this particular case, the cap 34 is formed integrally with the body of the corner member 24. This can be accomplished employing a die with removable central core and a replacement cavity conforming to the desired shape of the ornamental top 34. Preferably, the corner member 24 is die cast of zinc, zamac or other suitable material, however, it may be a stamped, forged or for that matter, need not be metal but may be formed of suitable, moldable plastic material. The preferred material however, is zinc and the surface of the corner member 24 may be suitable treatment such as electroplating or painting.

Appearing in FIG. 3 is a shelf member 16 which is formed integrally with the corner member 24 and extends inwardly between the frame members 12 and 13. Its elevation is determined by the desired location of a shelf which rests on four of the similar corner members. Below the shelf 16 is a threaded boss 61 also formed integrally in body 24 and designed to receive a set screw 62 which is driven in through the threaded opening in boss 61 and into an internal opening which receives the leg 21. The set screw 62 locks the leg 21 in place when the table is assembled. The set screw 62 and its boss 61 are concealed from normal view by the table top or shelf 16 if it is opaque and if it is transparent by the shelf support 60. The set screw 62, one for each corner, is the only device needed to assemble the table. A simple Allen head wrench or screw driver, if the set screw is so headed, is all that is required for assembly.

Now referring to FIG. 4, the underside of table 10 of FIG. 1 may be seen in fragmentary form showing the corner region including corner member 26 with adjacent frame members 14 and 15, the shelf support 60, boss 61 and leg 20. A portion of arm 26B is shown extending out of the tube 15. Note particularly a column 260 which defines a recess or hole 261. The column 260 extends the full inside diameter of the tube 15. The recess 261 is located at a fixed standard distance from the stop 65 formed integrally in the corner member 26. When tube 15 is telescoped over the arm 26B of the corner member 26 and comes to rest against stop 65, the tube 15 is in position to be staked into the recess 261. A portion of the staked tube 66 appears as a recess in the underside of the tube 15. Since it is recessed, it is not visible from the top or side of the table and even when viewed from the underside presents a smooth discontinuity in the tube surface. This staking arrangement eliminates the need for any fasteners to assemble the tube 15 to the corner member 26. The final appearance of the staked assembly is more easily viewed in examining tube 14. The attractive dimple 68 in the underside of the tube 14 does not detract from the appearance but provides an extremely rigid assembly of the tube 14 on the corner 26. For greatest strength the tubes are staked in two places 67 and 68 into similar recesses at a shorter distance from the stop 65 or its matching stop on the opposite arm of corner 26. The second dimpled or staked region is also at a predetermined distance from stop 65. Thus, assembly of the frame can be accomplished rapidly by telescoping two tube members 14 and 15 over adjacent arms 26A and B of the corner member 26 placing the assembly inverted and staking at four fixed positions, either simultaneously or in sequence to produce the staked connections 66–69. When so assembled, the corner and tubes become a fixed, rigid assembly perfectly satisfactory for furniture use.

Referring to FIG. 5, the unitary corner member 26 is more clearly shown including the stops 65A and B as well as the four columns 260, 261, 262 and 263. These columns extend the full height of the arms 26A and B and are each joined by integral webs 264 and 265 extending between adjacent columns. The legs 26A and 26B are actually in cruciform shape which is best shown in FIG. 9 in which an end-on view of one of the legs shows column 263 extending vertically and a web 270 extending horizontally with end flanges 271 and 272. Having the cruciform shape, the legs 26A and 26B will each receive either a circular tube as shown in FIG. 4 or a square tube as shown in fragmentary form in FIG. 9. Note also in FIG. 5 that the central body of corner member 26 includes an opening extending from top to bottom thereby allowing the corner 26 to receive a leg member which extends through body 26. The corner members 26 are symmetrical and may be used in upright or inverted form thus each of the columns 260 through 263 have recesses in both the upper and the lower ends although only the lower ones are used to conceal the mechanical connection between the corner 26 and its adjoining tubes. In FIG. 5 also, a leg end cap 30 shown in its normal position aligned with the opening in corner member 26 ready to receive the leg.

FIG. 6 is virtually identical with FIG. 5 with the exception that the top cap 35 is integrally formed with the corner member for use in a single level table as FIG. 1 or the top level in a stacked assembly as shown in FIG. 2. As indicated above, two types of parts as shown in FIG. 5 and FIG. 6 may be produced in the same die provided a suitable core is used when molding the central opening in the form of FIG. 5. A different core is used to form the closed end opening of FIG. 6 and the ornamental top. The arrangement of interchangeable cores through molding is well in the injection molding art. In both FIG. 5 and FIG. 6, the shelf support 60 and boss 61 appear at the intersection of the two arms.

FIGS. 7, 8 and 9 show the corner of FIG. 6 in various attitudes in order to illustrate completely its construction. The cruciform shape of the arms is best seen in FIG. 9 and the various reinforcing ribs 80 and 81 are best seen in FIG. 8. FIG. 9 shows how the corner member 26 receives a square tube using the identical corner. In this case, the cruciform shape serves to locate and secure the square tube 150 with equal precision as the round tubes of FIG. 4.

Thus in accordance with our invention, we have developed in a single corner member the capability of producing an attractive metal frame table in which the frame is factory assembled but the legs are easily removed. The table top support is provided by an integral tab or platform, one formed in each corner. The platform further serves to conceal the fastener for the legs. The frame corner members are easily assembled into a rigid structure merely by staking the underside of the tube at selected positions corresponding to the recesses in arm columns. Thus in a single member, all of the fastening and assembly features are present. The frame members and legs need only be tube members cut to the appropriate length. The corner members are equally useful in single level and stacked tables and may include an ornamental top.

The above described embodiments of this invention as merely descriptive of its principles and are not to be considered limiting. The scope of this invention instead shall be determined from the scope of the following claims, including their equivalents.

We claim:

1. A table comprising a plurality of unperforated tube members for defining a peripheral framework;
   a plurality of corner members each including a central body portion and at least two arms extending angularly with respect to each other and each in telescoping relationship with adjacent tube members thereby defining a junction of said framework;
   each of said arms defining at least one edge recess at a predetermined distance from said central body portion and adjacent to the interior of the wall of said tube member;
   said tubular members and respective arms in dimpled interlocking staked relationship with each other at said recess;
   the body portion of said corner member including a shelf support;
   said body portion of said corner members defining a connecting member for receiving legs in an orthogonal relationship with at least one of said arms
   wherein said arms are generally in cruciform shape with the extremities thereof matching the inside dimension of the tube member whereby said tube member and arms assume a generally rigid interconnection when telescoped; and
   wherein at least one of said cruciform portions of said arms extends in the direction downward when said table is in a normal position and said recess defined by said arm is at the underside of said arm whereby the dimpled connection between the arm and the tube is virtually invisible in normal use of the table.

2. A table comprising a plurality of tube members for defining a peripheral framework;
   a plurality of corner members each including a central body portion and at least two arms extending angularly with respect to each other and each in telescoping relationship with adjacent tube members thereby defining a junction of said framework;
   each of said arms defining at least one edge recess at a predetermined distance from said central body portion and adjacent to the interior of the wall of said tube member;
   said tubular members and respective arms in dimpled interlocking relationship with each other at said recess; the body portion of said corner member including a shelf support;
   said body portion of said corner members defining a connecting member for receiving legs in an orthogonal relationship with at least one of said arms;
   wherein arms are generally of cruciform shape with the extremities thereof matching the inside dimension of the tube member whereby said tube member and arms assume a generally rigid interconnection when telescoped; and
   wherein said arms include a column member extending from top to bottom when said table is in its normally upright position and said recess is located in the underside of said column.

3. The combination in accordance with claim 2 wherein the upperside of said column includes a second recess and whereby said corner member may be used in upright or inverted form.

4. A table comprising a plurality of unperforated tube members for defining a peripheral framework;
   a plurality of corner members each including a central body portion and at least two arms extending angularly with respect to each other and each in telescoping relationship with adjacent tube members thereby defining a junction of said framework;
   each of said arms defining at least one edge recess at a predetermined distance from said central body portion and adjacent to the interior of the wall of said tube member;
   said tubular members and respective arms in dimpled interlocking staked relationship with each other at said recess;
   the body portion of said corner member including a shelf support;
   said body portion of said corner members defining a connecting member for receiving legs in an orthogonal relationship with at least one of said arms wherein said arms each include a pair of columns formed integrally therewith and each of said columns extending into position adjacent to the interior wall of the respective telescoping tube over said arm and each of said columns having recesses therein at a fixed distance from the body portion of said corner member;
   said respective tube end arms being in staked relationship at the recesses of said columns.

5. The combination in accordance with claim 1 wherein said tubular members are round.

6. The combination in accordance with claim 1 wherein said tubular member are rectangular.

* * * * *